(12) United States Patent
Fujikura

(10) Patent No.: US 7,516,481 B2
(45) Date of Patent: Apr. 7, 2009

(54) PROGRAM DEVELOPMENT SUPPORTING APPARATUS, METHOD, PROGRAM AND RECORDING MEDIUM

(75) Inventor: Toshiyuki Fujikura, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 11/001,972

(22) Filed: Dec. 2, 2004

(65) Prior Publication Data

US 2005/0125775 A1 Jun. 9, 2005

(30) Foreign Application Priority Data

Dec. 5, 2003 (JP) ............................. 2003-408096

(51) Int. Cl.
*G06F 9/46* (2006.01)
(52) U.S. Cl. ........................... 726/3; 717/151; 717/152; 717/153; 717/154; 717/155; 717/156; 717/158; 717/157; 717/159; 717/160; 717/161; 717/149
(58) Field of Classification Search ................. 717/149, 717/119, 151–161; 726/3
See application file for complete search history.

(56) References Cited

U.S. PATENT DOCUMENTS

| | | | | |
|---|---|---|---|---|
| 4,972,314 | A | * | 11/1990 | Getzinger et al. ............ 711/149 |
| 5,832,272 | A | * | 11/1998 | Kalantery .................... 717/149 |
| 6,367,067 | B1 | * | 4/2002 | Odani et al. ................. 717/154 |
| 6,438,747 | B1 | * | 8/2002 | Schreiber et al. ............ 717/160 |

FOREIGN PATENT DOCUMENTS

| JP | 05088910 | 4/1993 |
|---|---|---|
| JP | 05113885 | 5/1993 |

OTHER PUBLICATIONS

Dilworth, R.P., "A Decomposition Theorem For Partially Ordered Sets," Annals of Mathematics, vol. 51, No. 1, Jan. 1950, pp. 161-166.
Hayashi et al., "A Design Support Technique for Parallel Processors using ADL," University of Tokyo, pp. 1642-1643.
Hoare, C.A.R., "Communicating Sequential Processes," Communications of the ACM, vol. 21, No. 8, Aug. 1978, pp. 666-677.

\* cited by examiner

*Primary Examiner*—Kambiz Zand
*Assistant Examiner*—Stephen Sanders
(74) *Attorney, Agent, or Firm*—Paul Coryea; Hoffman Warnick LLC

(57) ABSTRACT

A program development supporting apparatus that groups a plurality of events each executed in an information processor to divide the events into a plurality of parallel execution units to be executed in parallel with each other has a directional graph acquisition section that acquires directional graph data expressing each of the plurality of events as a vertex and a restriction on the execution order between two of the plurality of events as a directional branch, an inverse chain partial set extraction section that traces the directional branch from each event in the forward direction to extract from the directional graph data an inverse partial set that is a combination of the events having such a relationship that any one of the events cannot be reached from the other events, and a parallel execution unit assignment section that assigns the plurality of events belonging to the inverse partial set to units different from each other in the parallel execution units.

12 Claims, 12 Drawing Sheets

700a (a)

(b) A01=(supply->pickup1->set1_ready->A01)

(c)

PROGRAM DEVELOPMENT SUPPORTING APPARATUS, METHOD, PROGRAM AND RECORDING MEDIUM

DETAILED DESCRIPTION OF THE INVENTION

1. Field of the Invention

The present invention relates to a program development supporting apparatus, a program development supporting method, a program and a recording medium. More particularly, the invention relates to a program development supporting apparatus, a program development supporting method, a program and a recording medium for supporting the parallelism of a program to be developed.

2. Background Art

In recent years, to make the program development more efficient, a development environment for developing a program using a model of the program at the upper conceptual level has been implemented. In such a development environment, the model of the program is created based on a Communicating Sequential Process (CSP) theory.

For example, when a computer program for making parallel operation such as a built-in computer program for controlling an apparatus is developed, it is important how each process within the computer program is assigned to parallel execution units such as process, task or active object.

Conventionally, the creator of the computer program made assignment of parallel execution units, relying on experience and intuition. Therefore, it was common that each function of the program is divided into parallel execution units by taking account of the easiness of the program rather than the efficiency of parallelism.

For example, when a program for analyzing a command input from an input device and performing processing corresponding to the command to output the processing result was created, it was common that each function of the program would be divided into the modules, such as a module for input processing, a module for command analysis, a module for processing corresponding to the command and a module for outputting the processing result.

When the computer program to be developed is divided into parallel execution units beyond the parallelism included in the program, it is required that the synchronization, which is essentially unnecessary, be included in the program, making the program more complicated. On the other hand, when the number of parallel execution units is less than the parallelism included in the program, the processes executable in parallel are executed successively, resulting in less efficiency of executing the program.

Thus, it is an object of the invention to provide a program development supporting apparatus, a program development supporting method, a program and a recording medium that can solve the above-mentioned problems. This object is achieved in a combination of the features as defined in the independent claims among the claims of the invention. The dependent claims define more beneficial specific examples of the invention.

SUMMARY OF THE INVENTION

The present invention provides a program development supporting apparatus which groups a plurality of events each executed in an information processor to divide the events into a plurality of parallel execution units to be executed in parallel with each other, the apparatus comprising a directional graph acquisition section which acquires directional graph data expressing each of the plurality of events as a vertex and a restriction on the execution order between two of the plurality of events as a directional branch, an inverse chain partial set extraction section which traces the directional branch from each event in the forward direction to extract from the directional graph data an inverse partial set which is a combination of the events having such a relationship that any one of the events cannot be reached from the other events, and a parallel execution unit assignment section which assigns the plurality of events belonging to the inverse partial set to units different from each other in the parallel execution units, as well as a program development supporting method, a program and a recording medium regarding the program development supporting apparatus.

The above outline of the invention does not enumerate all the essential features of the invention, but a sub-combination of these features may constitute the invention.

With this invention, it is possible to appropriately divide the events into the parallel execution units by extracting the parallelism included in the program of development object.

DETAILED DESCRIPTION OF THE INVENTION

The present invention is described below in connection with the preferred embodiment, which does not limit the invention as defined in the claims of the invention, and all the combinations of features as described in the embodiments are not requisite to solving means of the invention.

Figure 1:
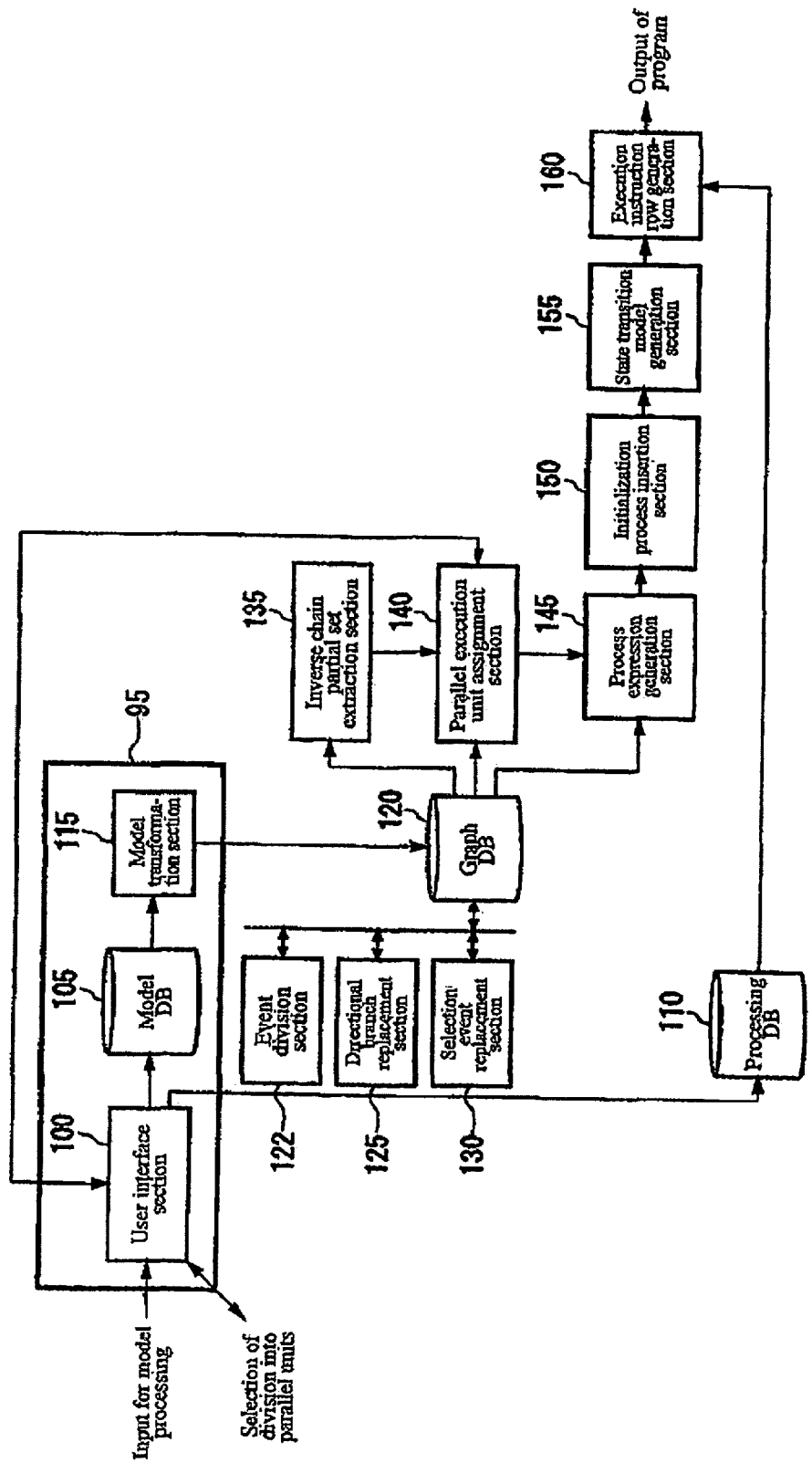
FIG. 1 is a block diagram showing the configuration of a program development supporting apparatus 10 according to an embodiment of the invention.

FIG. 1 shows the configuration of a program development supporting apparatus 10 according to an embodiment of the invention. The program development supporting apparatus 10 supports the program development using a model for a program of development object that is constructed at the upper conceptual level. More specifically, the program development supporting apparatus 10 groups a plurality of events into parallel execution units to be executed in parallel with each other appropriately, the plurality of events being described in the model for the program input by a program developer and executed in an information processor.

Such information processor may be, for example, a controller for controlling various types of Factory Automation (FA) apparatuses installed within a factory, a controller for controlling various kinds of devices provided within a vehicle, a built-in computer for controlling the input/output devices of a computer, or the like. The program development supporting apparatus 10 supports the development of the program to enable the information processor to control the FA apparatuses or the input/output devices.

The program development supporting apparatus 10 comprises a directional graph acquisition section 95, a processing database (DB) 110, a graph DB 120, an event division section 122, a directional branch replacement section 125, a selection event replacement section 130, an inverse chain partial set extraction section 135, a parallel execution unit assignment section 140, a process expression generation section 145, an initialization process insertion section 150, a state transition model generation section 155, and an execution instruction row generation section 160.

The directional graph acquisition section 95 receives as input a model of the program from the developer, and converts the input model into data of graph structure. More specifically, the directional graph acquisition section 95 acquires the directional graph data indicating a plurality of events and their execution order from the input model.

The directional graph acquisition section 95 has a user interface section 100, a model DB 105, and a model transformation section 115. The user interface section 100 allows the developer to make the input/output processing. More specifically, the user interface section 100 receives the model of the program from the developer, and stores it in the model DB 105. This model may be an activity chart or sequence chart in the Unified Modeling Language (UML), describing an order restriction and an order specification for a plurality of events including an instruction group or a function that is a unit of execution in the information processor. Herein, the order restriction involves the execution order of events that the model of the program has on the structure, and the order specification involves the execution order of steps as specified by the developer.

Also, the user interface section 100 obtains the processing content of each event described in the model, and stores the processing content of the event and the associated identification information for identifying the event in the processing DB 110. Also, the user interface section 100 enables the developer to select one of the assignment methods, when there are two or more assignment methods for assigning a plurality of events to a plurality of parallel execution units.

The model transformation section 115 acquires the directional graph data from the model stored in the model DB 105 based on the order restriction and order specification for the plurality of events. This directional graph data is the data structure expressing each of the plurality of events contained in the program as a vertex and a restriction on the execution order between two of the plurality of events, namely, a restriction based on the order restriction and order specification, as a directional branch. And the model transformation section 115 stores the directional graph data acquired from the model in the graph DB 120.

The event division section 122 divides an event on a circulation path into two events when the directional graph data stored in the graph DB 120 contains the circulation path. The directional branch replacement section 125 replaces the circulation path in the directional graph data with the non-circulation path by connecting the directional branch connected from the event before division by the event division section 122 to another event to one event after division, and connecting the directional branch connected to the event before division to the other event after division. The selection event replacement section 130 replaces collectively two or more events with one event when the directional graph data contains two or more events that are executed selectively. Also, when a different event is executed depending on which event is selectively executed, a set of events executed corresponding to the selectively executed event is collectively replaced with one event. Thereby, the interdependence between events is resolved, making it possible to extract parallel execution units appropriately.

The inverse chain partial set extraction section 135 extracts a set of events executable in parallel from the directional graph data stored in the graph DB 120 and converted by the event division section 122, the directional branch replacement section 125 and the selection event replacement section 130. The parallel execution unit assignment section 140 assigns the events belonging to the set of events executable in parallel that are extracted by the inverse chain partial set extraction section 135 to parallel execution units that are different from each other. Then, the parallel execution unit assignment section 140 assigns each event not belonging to the set of events executable in parallel to any of the parallel execution units based on a restriction on execution order between events belonging to the set of events executable in parallel. And the parallel execution unit assignment section 140 displays two or more assignment methods to the developer via the user interface section 100, and decides assignment of parallel execution units in accordance with an assignment method selected by the developer when there are two or more assignment methods for assigning a plurality of events to a plurality of parallel execution units.

The process expression generation section 145 generates a process expression representing the relationship of execution order of the events assigned to the parallel execution units for each of the plurality of parallel execution units. Herein, the process expression generation section 145 may generate, as this process expression, a Communicating Sequential Process (CSP) process expression defining a CSP process as is known in the art. The initialization processing insertion section 150 inserts an initialization process into the process expression for an event contained in the process expression to be initialized before execution, so that the initialization process for the event is performed before execution of the event.

The state transition model generation section 155 generates a state transition model for the parallel execution unit by receiving the process expression of the parallel execution unit from the initialization process insertion section 150 for each of the plurality of parallel execution units. The execution instruction row generation section 160 generates an execution instruction row of the parallel execution unit based on at least one of the process expression and the state transition model and the processing content of each event stored in the processing DB 110 by receiving the process expression of the parallel execution unit and the state transition model from the state transition model generation section 155 for each of the plurality of parallel execution units.

More specifically, the execution instruction row generation section 160 designates an executable event for each state of parallel execution unit, based on at least one of the process expression and the state transition model. And the execution instruction row generation section 160 generates an execution instruction row for executing the processing content in the state by retrieving the processing content of the event from the processing DB 110 with the identification information of the event executable for each state as a retrieval key.

Figure 2:
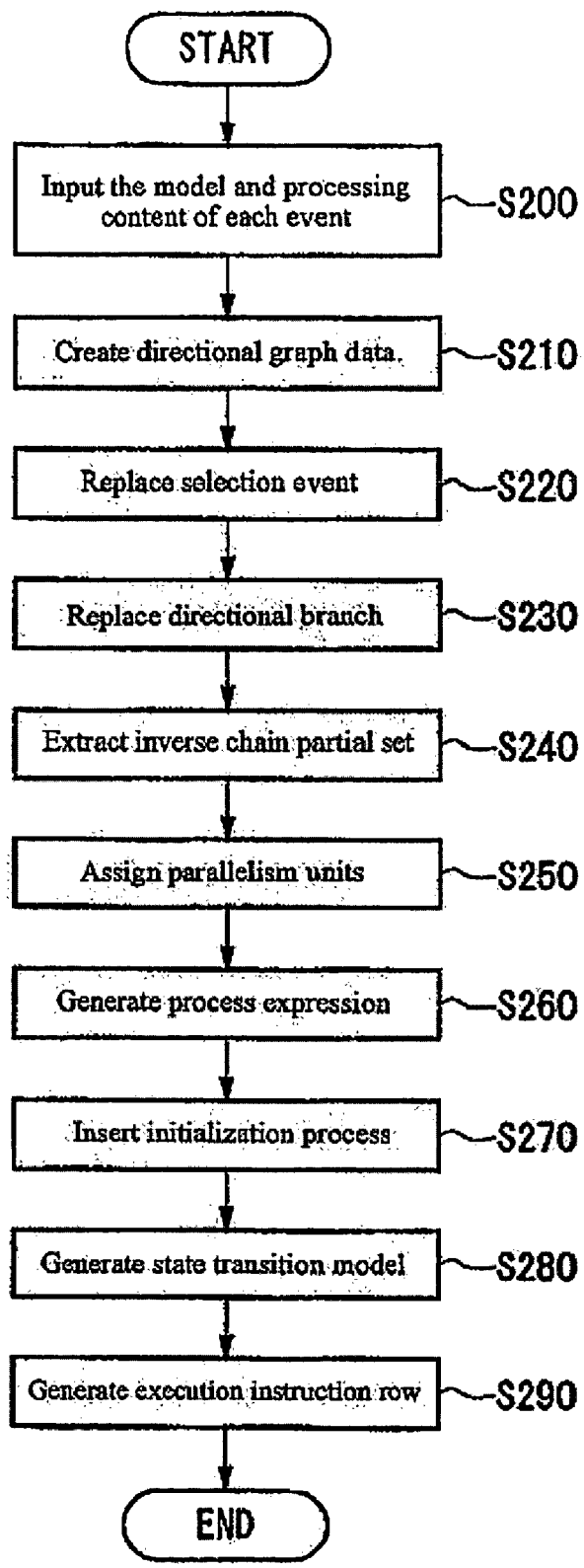
FIG. 2 is a flowchart showing an operation flow of the program development supporting apparatus 10 according to the embodiment of the invention.

FIG. 2 is a flowchart showing an operation flow of the program development supporting apparatus 10 according to the embodiment of the invention.

First of all, the user interface section 100 receives as input a model of program and stores it in the model DB 105. Also, the user interface section 100 obtains the processing content of each of a plurality of events contained in the model, and stores it in the processing DB 110 (step S200). Then, the model transformation section 115 acquires the directional graph data from the model stored in the model DB 105, and stores it in the graph DB 120 (S210). Herein, when an inverse order structure having no circulation path is taken and two or more events selectively executed are not contained, this directional graph data is called a Hasse diagram.

Then, when the directional graph data stored in the graph DB 120 is not the Hasse diagram, the directional graph data is transformed into an extended Hasse diagram in which a semi-order structure having no circulation path is taken and two or more events executed selectively are contained.

That is, the selection event replacement section 130 searches the directional graph data stored in the graph DB 120, and determines whether or not a plurality of events provided for in the directional graph data contain two or more selection events executed selectively and two or more correspondence events each corresponding to each of two or more selection events and executed when the corresponding selection event is executed. If the plurality of events provided for in the directional graph data contain two or more selection events executed selectively and two or more correspondence events each corresponding to each of two or more selection events and executed when the corresponding selection event is executed, the selection event replacement section 130 replaces two or more selection events in the directional graph data with one event, and replaces the two or more correspondence events with one event (S220). More specifically, the selection event replacement section 130 adds one event with which two or more selection events are replaced to the directional graph data, and rewrites the information for identifying the event at the start point or end point of the directional branch, so that the directional branch with any selection event at the start point or end point becomes the directional branch with the replaced event at the start or end point. Similarly, the selection event replacement section 130 adds one event with which two or more correspondence events are replaced to the directional graph data, and rewrites the information for identifying the event at the start point or end point of the directional branch, so that the directional branch with any correspondence event at the start point or end point becomes the directional branch with the replaced event at the start or end point. Thereby, the selection event replacement section 130 can convert the directional graph data into the structure not containing two or more events executed selectively.

Then, the event division section 122 duplicates an event at the start position of the circulation path to the event at the end position of the circulation path and cuts off the path returning from the end position of the circulation path to the start position to convert the circulation path into the non-circulation path, when there is any circulation path in the directional graph data (S230). More specifically, the event division section 122 divides an event executed repeatedly in the information processor among the plurality of events into a first division event and a second division event. And the directional branch replacement section 125 replaces the directional branch with the event at the start point on the circulation path leading to the event with the directional branch with the first division event at the start point, and replaces the directional branch with the event at the end point with the directional branch with the second division event at the end point by tracing the directional branch from the event in the directional graph data in the forward direction. Thereby, the event division section 122 and the directional branch replacement section 125 replace the circulation path with the non-circulation path leading from the first division event as the start point to the second division event.

When the directional graph data stored in the graph DB 120 is not the Hasse diagram, the program development supporting apparatus 10 transforms the directional graph data into the extended Hasse diagram in accordance with a procedure at the steps S220 and S230.

Then, the inverse chain partial set extraction section 135 extracts a set of events executable in parallel from the directional graph data representing the Hasse diagram or extended Hasse diagram (S240). Herein, two events can not be performed in parallel because there is a restriction on execution order between two events when it is possible to lead from one event to the other event directly or via one or more events by tracing the directional branch from one event in the forward direction. A set of events having such a relationship that any one of the events cannot be reached from other events by tracing the directional branch from each event in the forward direction is called an inverse chain partial set. The inverse chain partial set extraction section 135 extracts an inverse partial set from the directional graph data to extract a set of events executable in parallel.

At step S240, the inverse chain partial set extraction section 135 extracts from the directional graph data an inverse chain partial set in which the number of events belonging to the inverse chain partial set is maximum among a plurality of inverse chain partial sets extractable from the directional graph data. Thereby, the inverse chain partial set extraction section 135 can extract the parallelism from the program of development object to the utmost.

When two or more selection events and two or more correspondence events are replaced with one event by the selection event replacement section 130 at step S220, the inverse chain partial set extraction section 135 extracts the inverse chain partial set from the directional graph data in which two or more selection events and two or more correspondence events are replaced with one event. Likewise, when the directional graph data having the circulation path is converted into the directional graph data having no circulation path by the event division section 122 and the directional branch replacement section 125 at step S230, the inverse chain partial set extraction section 135 extracts the inverse chain partial set from the directional graph data having no circulation path.

Then, the parallel execution unit assignment section 140 assigns the plurality of events belonging to the inverse chain partial set to parallel execution units different from each other. The parallel execution unit assignment section 140 of this embodiment assigns the plurality of events belonging to the inverse chain partial set to the same number of parallel execution units as the number of events belonging to the inverse chain partial set (S250). Thereby, the parallel execution unit assignment section 140 can assign the plurality of parallel execution units to make the best use of the parallelism included in the program of development object.

Moreover, the parallel execution unit assignment section 140 assigns, for each of the plurality of events belonging to the inverse chain partial set, the events that can be reached sequentially by tracing the directional branch from the event in at least one of the forward direction and the reverse direction to the same parallel execution unit as the event. At this time, the parallel execution unit assignment section 140 assigns the events that can be reached from the event belonging to the inverse chain partial set to the parallel execution unit, under the condition that the events that can be reached from the event belonging to the inverse chain partial set are not assigned to the other parallel execution units. Thereby, when any event reached from the event belonging to the inverse chain partial set is assigned to the other parallel execution unit, the parallel execution unit assignment section 140 stops to trace the directional branch ahead from the event and assigns only the events closer to the event belonging to the inverse chain partial set than the stopped event to the parallel execution unit. Thereby, the parallel execution unit assignment section 140 can assign the events having a restriction on the execution order for the event belonging to the inverse chain partial set to the same parallel execution unit. Herein, the parallel execution unit assignment section 140 may divide the plurality of events into the minimum number of chains, using a maximum matching retrieval algorithm as is known in the art, and use this minimum number of chains as being divided into the parallel execution units.

In the above description, the parallel execution unit assignment section 140 assigns the first division event and the second division event that are divided from one event on the circulation path by the event division section 122 to the same parallel execution unit. Thereby, two division events to perform the same processing are assigned to the same parallel execution unit and processed in the parallel execution unit.

The process expression generation section 145 generates, for each parallel execution unit, a process expression representing the execution order of events assigned to the parallel execution unit, based on the execution order specified by the directional branch between events assigned to the parallel execution unit and the execution order specified by the directional branch with the event assigned to other parallel execution unit at the start point and the event assigned to the parallel execution unit at the end point (S260). Thereby, the process expression generation section 145 describes each path of the Hasse diagram or extended Hasse diagram as the process expression.

Then, the initialization process insertion section 150 inserts the initialization process into the process expression to initialize the event before execution of the event to undergo the initialization process before execution (S270). More specifically, the initialization process insertion section 150 changes the process expression to perform the initialization process after execution of the event located at the start point of the directional branch connected with the event at the end point. Thereby, the initialization process insertion section 150 inserts the initialization process of one event by changing only a portion corresponding to the directional branch located between any event to be executed before execution of one event and the one event in the process expression.

Then, the state transition model generation section 155 generates, for each of the plurality of parallel execution units, a state transition model for the parallel execution unit in accordance with the process expression (S280). Herein, the state transition model for the parallel execution unit comprises a plurality of states specifying whether or not each of the events belonging to the parallel execution unit and the events not belonging to the parallel execution unit connected to the event belonging to the parallel execution unit is executed, and the transition conditions among the plurality of states. Also, the state transition model generation section 155 may verify whether or not a dead lock or live lock occurs in the program based on the generated process expression and the state transition model.

The state transition model generation section 155 may input the state transition model for all or a part of at least one parallel execution unit via the user interface section 100 from the developer, and incorporate the state transition model as all or a part of the state transition model generated by the state transition model generation section 155.

Then, the execution instruction row generation section 160 generates an execution instruction row for each of the plurality of parallel execution units based on the process expression for the parallel execution unit and the state transition model (S290). Herein, the execution instruction row for the parallel execution unit enables the information processor to perform the processing corresponding to the event belonging to the parallel execution unit and make the state transition based on the state transition model, with an input of the execution result of the event not belonging to the parallel execution unit connected to the event belonging to the parallel execution unit through the directional branch.

Herein, the execution instruction row generation section 160 generates an execution instruction row for initializing one event to be initialized before execution under the condition that the event connected to the start point of the directional branch with the one event at the end point is executed.

With the program development supporting apparatus 10 as described above, it is possible to create the Hasse diagram or extended Hasse diagram representing the relationship of execution order of the plurality of events contained in the program from the model of the program input by the developer, and appropriately assign the plurality of events to the plurality of parallel execution units, based on the Hasse diagram or extended Hasse diagram. And the program development supporting apparatus 10 generates the process expression for each parallel execution unit and the state transition model, and generates the execution instruction row for each parallel execution unit based on the generated process expression and state transition model.

Figure 3:
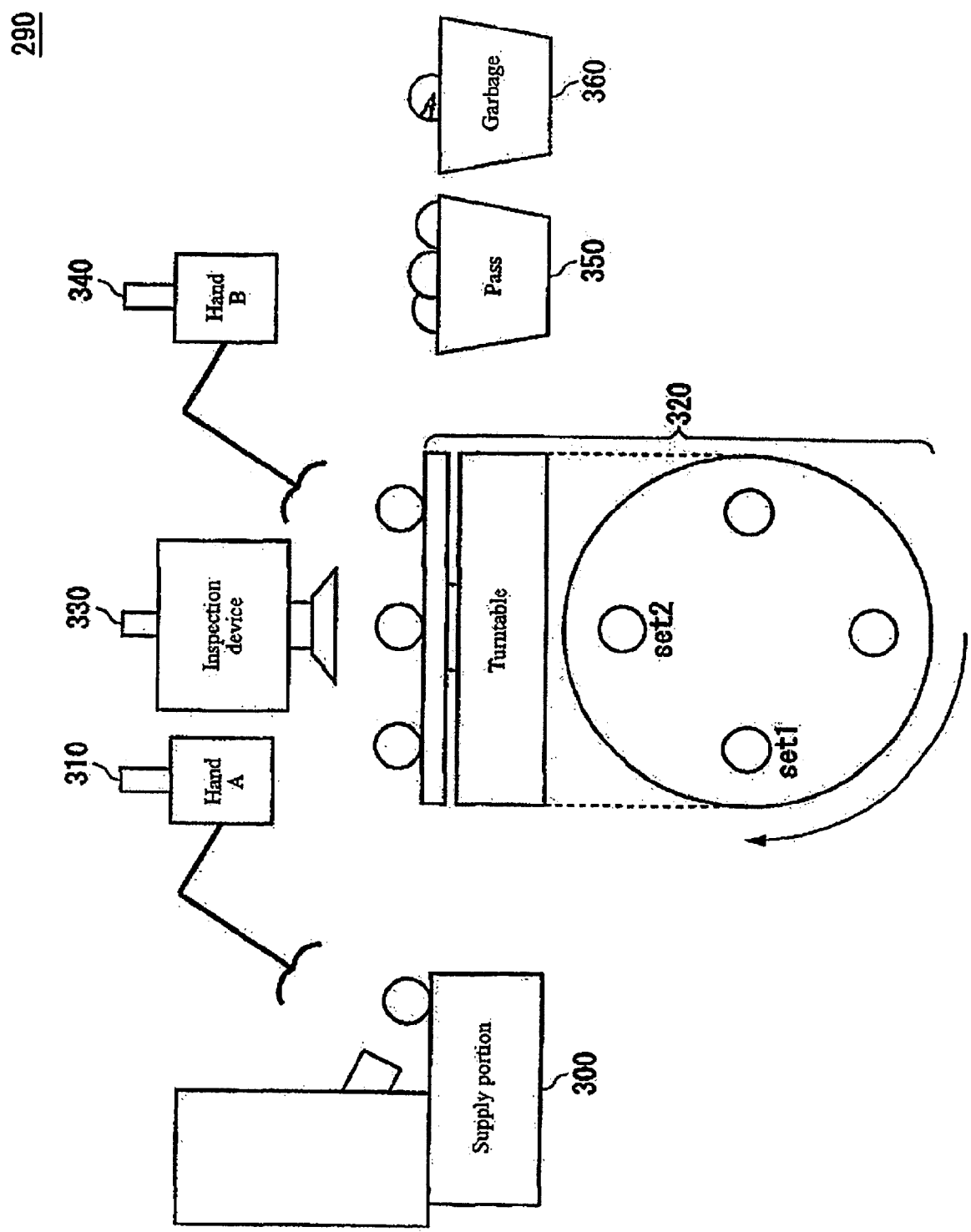
FIG. 3 is a diagram showing a development object system 290 with the program development supporting apparatus 10 according to the embodiment of the invention.

FIG. 3 is a diagram showing one example of the development object system 290 with the program development supporting apparatus 10 according to the embodiment of the invention.

The development object system 290 comprises a supply portion 300, a hand A310, a turntable 320, an inspection device 330, a hand B340, a pass container 350, and a garbage can 360. The supply portion 300 supplies the product. The hand A 310 moves the product supplied by the supply portion 300 to the position of "set1" on the turntable 320. The turntable 320 rotates a rotational portion of the turntable to move the product laid at the position of "set1" to the position of "set2". The inspection device 330 inspects the product moved to the position of "set2". The hand B340 moves the product that is determined normal as a result of inspection by the inspection device 330 to the pass container 350, and moves the product that is determined abnormal to the garbage can 360.

The operation of the program development supporting apparatus 10 will be described below using an example of developing the program for the information processor that controls the development object system 290.

Figure 4:
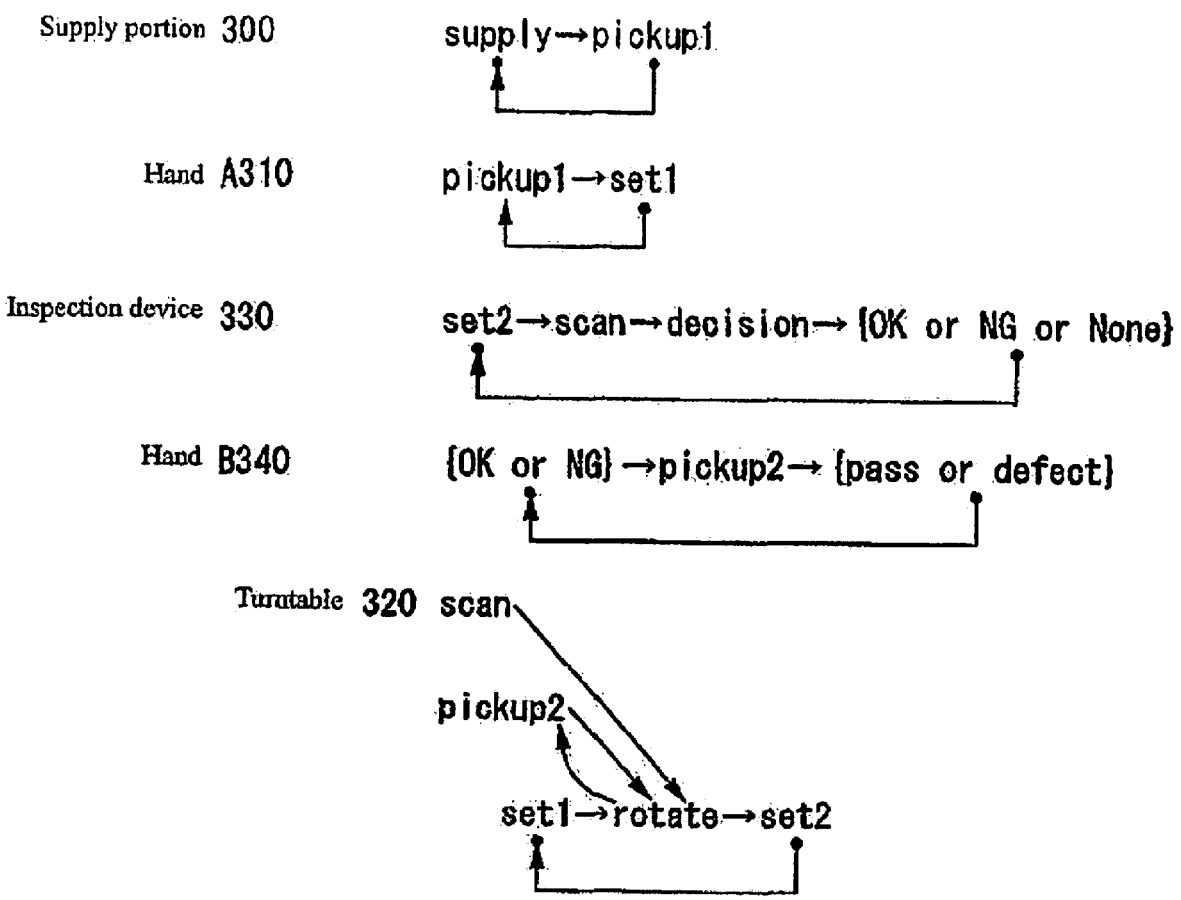
FIG. 4 is a diagram showing one example of the operation description for each unit in the development object system 290 according to the embodiment of the invention.

FIG. 4 is a diagram showing one example of the operation description for each unit in the development object system 290 according to the embodiment of the invention. The operation of each of the supply portion 300, the hand A310, the turntable 320, the inspection device 330 and the hand B340 is given as the operation description as shown in FIG. 4.

The supply portion 300 supplies the product. When the supplied product is picked up by the hand A310 (pickup1), the supply portion 300 supplies the next product. The hand A310 picks up the product from the supply portion 300 and lays it on the turntable 320 (set1). The turntable 320 is rotated (rotate) to move the product to the position of "set2", if the product is laid on the turntable 320 (set1). Herein, in the case where the product is inspected successively, the turntable 320 is rotated after the inspection device 330 ends the inspection (scan), and the product is picked up by the hand B340 (pickup2).

The inspection device 330 inspects the product when the product is moved to the position of "set2", and determines whether the product is normal (OK) or abnormal (NG) (decision) to output the determination output. Herein, when the product is not laid at the position of "set2", "None" is output as the determination result. Then, the hand B340 picks up the product, when the determination result is "OK" or "NG", and moves the product to the pass container 350 (pass) or the garbage can 360 (defect) in accordance with the determination result.

The "supply", "pickup1", "set1", "rotate", "set2", "scan", "decision", "OK", "NG", "None", "pickup2", "pass" and "defect" are one example of events in this invention.

Herein, in the development object program for controlling the operation of each unit, when the operation of each unit is assigned to a different parallel execution unit, the program is divided into five parallel execution units for controlling the supply portion 300, the hand A310, the turntable 320, the inspection device 330, and the hand B340. The assignment to the parallel execution units is easily understood by the developer, because the program is divided according to the function of program, although the parallelism of the program may not be considered or efficiently made in some cases.

Figure 5:
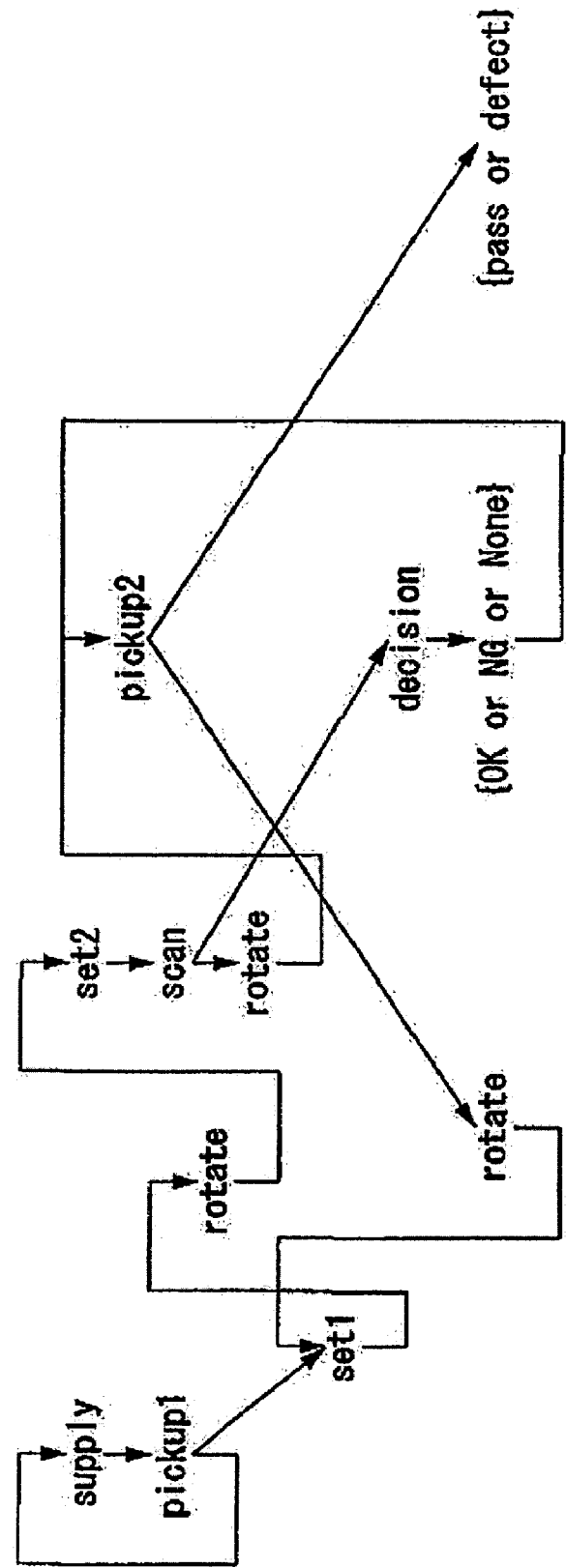
FIG. 5 shows the directional graph data acquired from a model of the development object system 290 according to the embodiment of the invention.

FIG. 5 shows the directional graph data acquired from a model of the development object system 290 according to the embodiment of the invention. The model transformation section 115 acquires the directional graph data from the model with a timing chart or an activity chart input via the user interface section 100 from the program developer. More specifically, the model transformation section 115 extracts a pair of events having dependence relation on the execution order, based on a restriction or specification on the order between events as described in the model. Herein, the model transformation section 115 may display the extracted pair of events to the program developer to designate whether or not the event pair is employed, and selectively extract only the event pair designated to employ. Thereby, the model transformation section 155 prevents the developer from employing an unintended restriction on the order.

And the model transformation section 115 connects the pair of events to generate the directional graph data.

Figure 6:
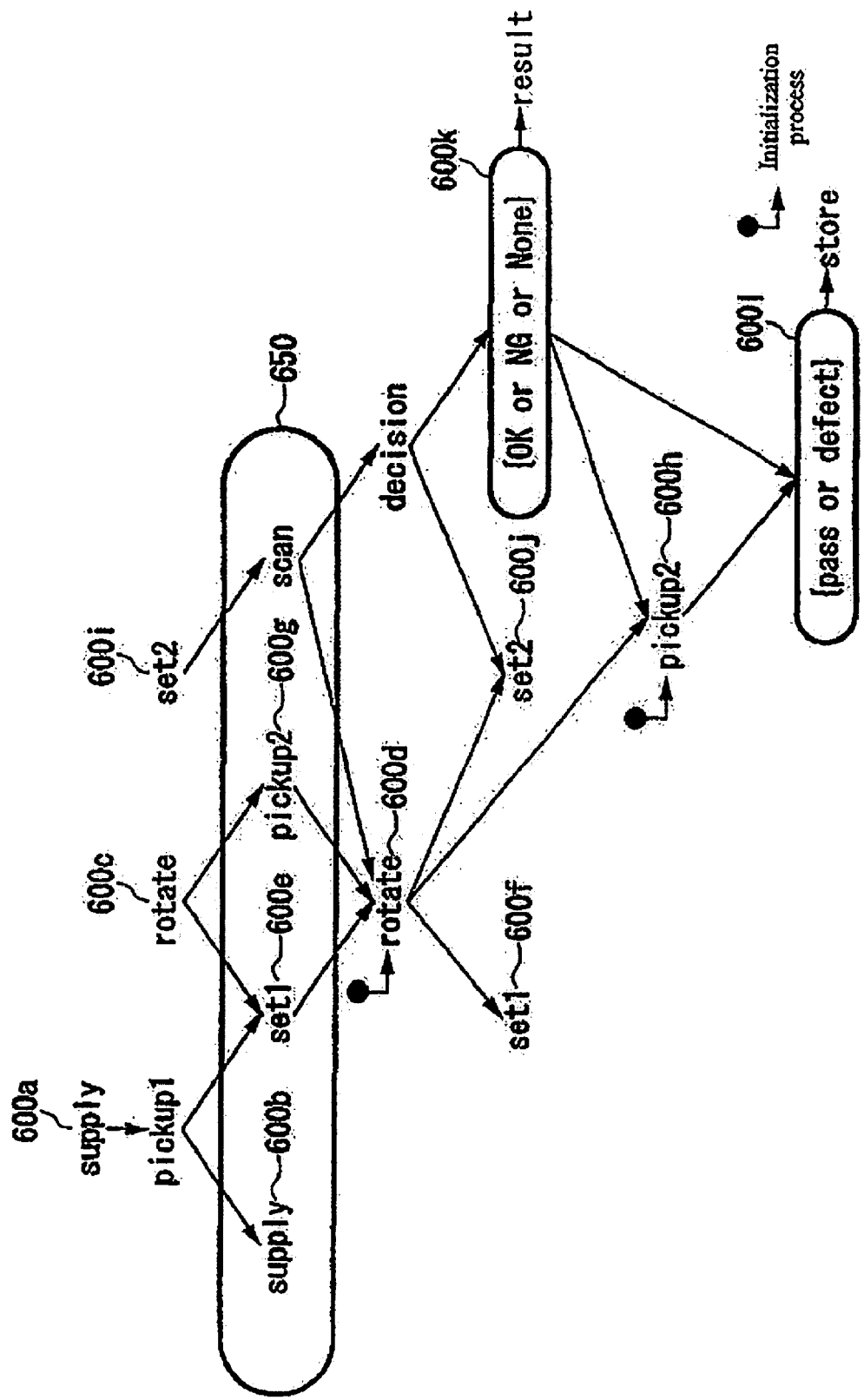
FIG. 6 is an extended Hasse diagram of the development object system 290 according to the embodiment of the invention.

FIG. 6 is an extended Hasse diagram of the development object system 290 according to the embodiment of the invention. In FIG. 5, the directional graph data acquired from the model by the model transformation section 115 has a circulation path such as a path through "supply" and "pickup1", for example, and comprises a combination of selection events of "OK", "NG" and "None", and a combination of correspondence events of "pass" and "defect". Accordingly, the event division section 122, the directional branch replacement section 125 and the selection event replacement section 130 transforms this directional graph data into the extended Hasse diagram.

Figure 7:
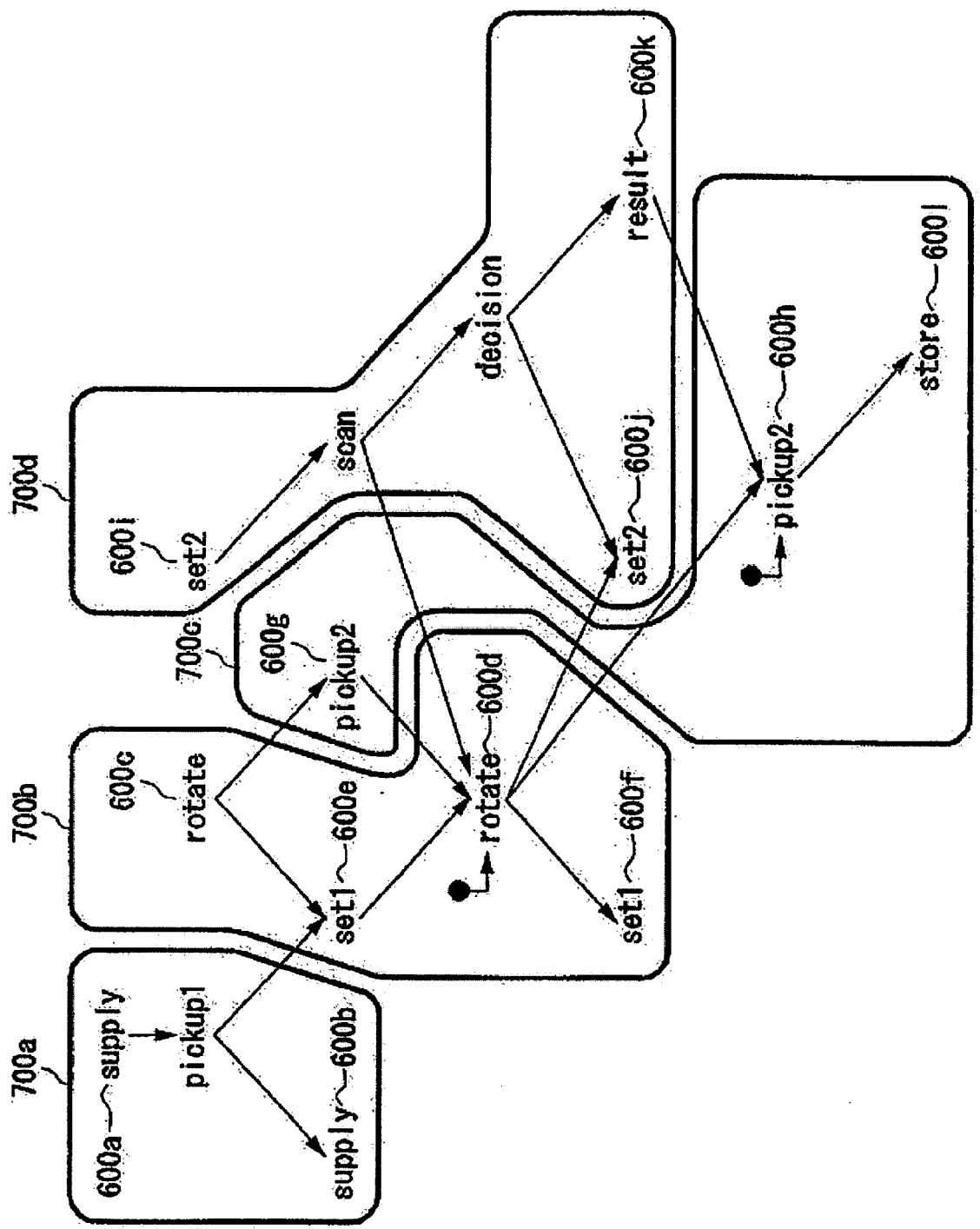
FIG. 7 shows a parallel execution unit 700 extracted from the extended Hasse diagram of the development object system 290 according to the embodiment of the invention.

First of all, the selection event replacement section 130 replaces three selection events of "OK", "NG" and "None" with one event 600k "result" (also shown in FIG. 7). Also, the selection event replacement section 130 replaces two correspondence events of "pass" and "defect", which are executed corresponding to these selection events, with one event 600l "store" (also shown in FIG. 7). Thereby, the selection event replacement section 130 can convert the directional graph data into the structure not containing two or more events selectively executed.

Also, the event division section 122 divides "supply" on the circulation path in FIG. 5 into the first event 600a and the second event 600b. And the directional branch with "supply" in FIG. 5 at the start point is replaced with the directional branch from the first event 600a to "pickup1", and the directional branch with "supply" in FIG. 5 at the end point is replaced with the directional branch from "pickup1" to the second event 600b, thereby changing the circulation path to the non-circulation path. Likewise, the event division section 122 divides "rotate" into the first event 600c and the second event 600d, divides "set1" into the first event 600e and the second event 600f, divides "pickup2" into the first event 600g and the second event 600h, and divides "set2" into the first event 600i and the second event 600j, thereby replacing the corresponding directional branch.

Through the above process, the program development supporting apparatus 10 can convert the directional graph data stored in the graph DB 120 into the extended Hasse diagram. Then, the inverse chain partial set extraction section 135 extracts a maximum inverse chain partial set 650 in which the number of events belonging to the inverse chain partial set is maximum among the inverse chain partial set of the directional graph from the directional graph data after conversion that becomes the extended Hasse diagram.

FIG. 7 shows a parallel execution unit 700 extracted from the extended Hasse diagram of the development object system 290 according to the embodiment of the invention. The parallel execution unit assignment section 140 assigns "supply", "set1", "pickup2" and "scan" belonging to the maximum inverse chain partial set 650 to the parallel execution units 700a, 700b, 700c and 700d, respectively. And for the parallel execution units 700, the events that can be reached by tracing the directional branch from the event belonging to the maximum inverse chain partial set 650 in at least one of the forward direction and the reverse direction are assigned to the parallel execution unit 700. For example, the parallel execution unit assignment section 140 assigns "pickup1" that is reached by tracing the directional branch from "supply" belonging to the maximum inverse chain partial set 650 in the reverse direction to the parallel execution unit 700a. Also, the parallel execution unit assignment section 140 assigns "decision" and "set2" that are reached by tracing the directional branch from "scan" belonging to the maximum inverse chain partial set 650 in the forward direction to the parallel execution unit 700d.

Herein, the parallel execution unit assignment section 140 stops to trace the directional branch ahead of the event, when the event reached from the event belonging to the maximum inverse chain partial set 650 is assigned to the other parallel execution unit. Also, the events 600a and 600b, the events 600c and 600d, the events 600e and 600f, the events 600g and 600h, and the events 600i and 600j, which are divided from one event on the circulation path, are assigned to the same parallel execution unit 700.

Figure 8:
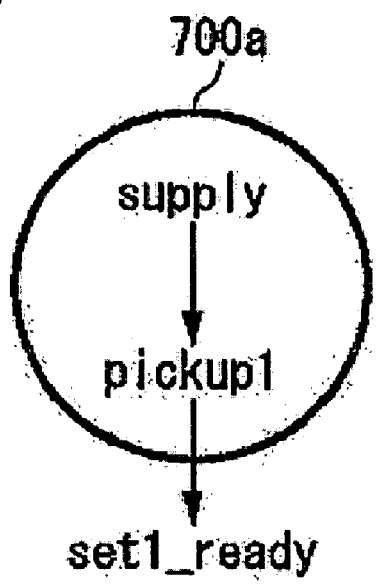
FIG. 8 shows (a) graph structure, (b) process expression and (c) state transition model for the parallel execution unit 700a according to the embodiment of the invention.
Figure 8:
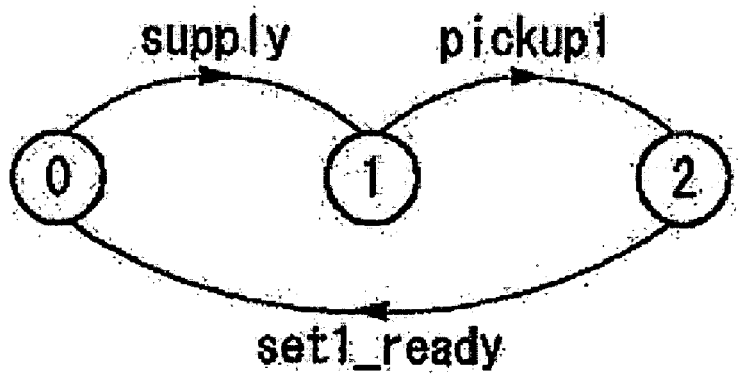

FIG. 8 shows (a) graph structure, (b) process expression and (c) state transition model for the parallel execution unit 700a according to the embodiment of the invention. The parallel execution unit 700a repeats a process of executing "pickup1" after execution of "supply", and outputting "set1_ready" indicating that "set1" is ready to execute. The process expression generation section 145 generates the process expression AO1 of executing "supply", "pickup1" and "set1_ready" in this execution order and returning to the process of AO1 for the parallel execution unit 700a. And the state transition model generation section 155 generates the state transition model including the states "0", "1" and "2" specifying whether or not each event of "supply", "pickup1" and "set1_ready" is executed in accordance with the process expression AO1, and the transition conditions where the state transits from "0" to "1" if "supply" is executed, the state transits from "1" to "2" if "pickup1" is executed, and the state transits from "2" to "0" if "set1_ready" is executed.

The execution instruction row generation section 160, for the parallel execution unit 700a, receives the process expression AO1 and the state transition model from the state transition model generation section 155, and generates the execution instruction row for the parallel execution unit 700a, based on the process expression, the state transition model and the processing content of each event stored in the processing DB 110.

Figure 9:
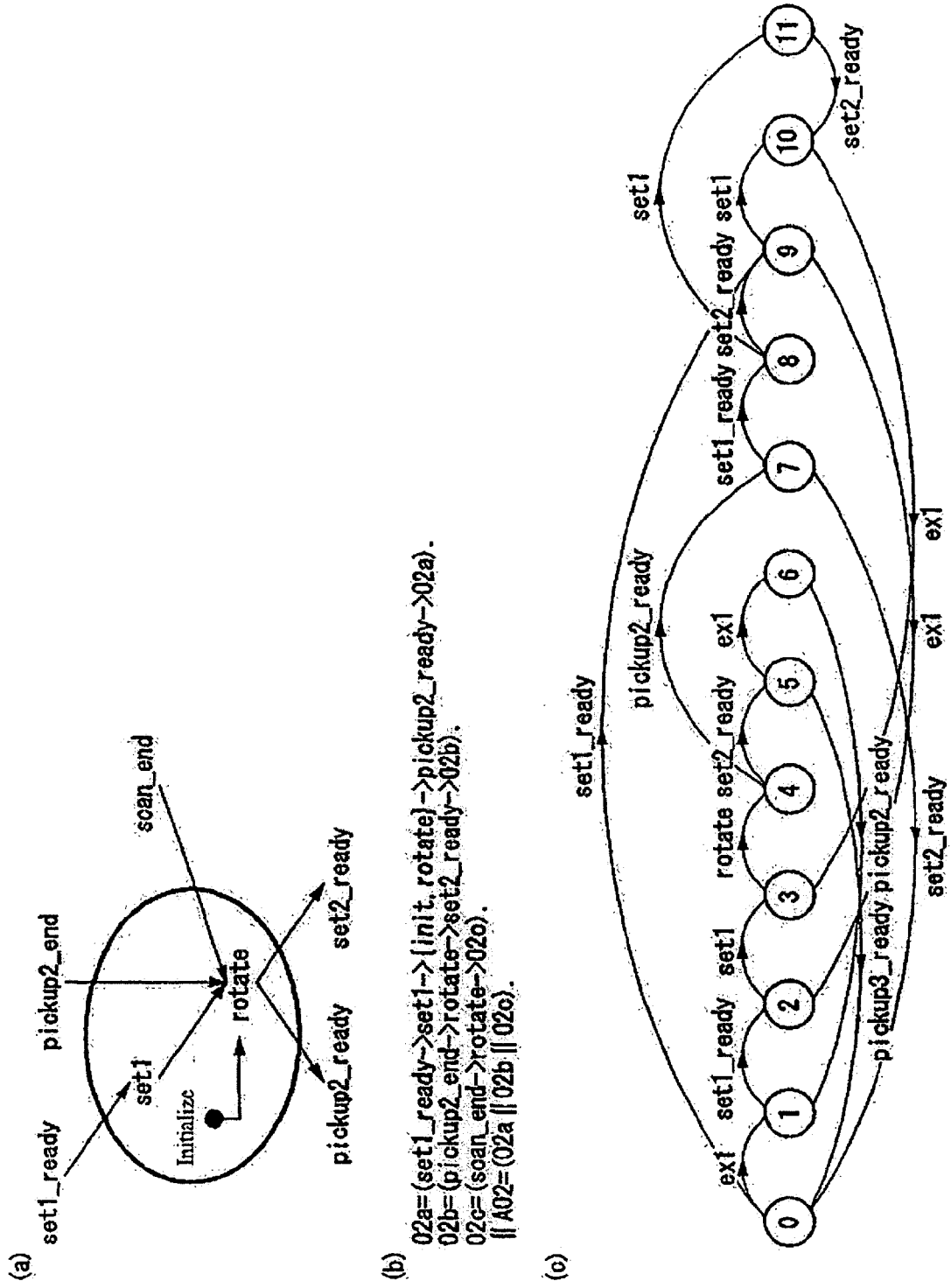
FIG. 9 shows (a) graph structure, (b) process expression and (c) state transition model for the parallel execution unit 700b according to the embodiment of the invention.

FIG. 9 shows (a) graph structure, (b) process expression and (c) state transition model for the parallel execution unit 700b according to the embodiment of the invention. The parallel execution unit 700b executes "set1" if "set1_ready" is input from the parallel execution unit 700a. Also, when "set1" is executed and "pickup2_end" and "scan_end" are input, "rotate" is executed, and "pickup2_ready" and "set2_ready" are output to the parallel execution units 700c and 700d, respectively. Herein, it is required that the parallel execution unit 700b performs the initialization process prior to execution of "rotate".

The process expression generation section 145 generates the process expression O2a of inputting "set1_ready", executing "set1" and "rotate", outputting "pickup2_ready", and returning to the process of O2a for the parallel execution unit 700b. Also, it generates the process expression O2b of inputting "pickup2_end", executing "rotate", outputting "set2_ready", and returning to the process of O2b. Also, it generates the process expression O2c of inputting "scan_end", executing "rotate" and returning to the process of O2c. And the process expression generation section 145 generates the total process expression AO2 for the parallel execution unit 700b as a parallel combination of the process expressions O2a, O2b and O2c.

The initialization process insertion section 150 changes the process expression O2a to perform the initialization process of "rotate" after execution of "set1" located at the start point of the directional branch from "set1" selected from the directional branch connected with "rotate" at the end point to perform the initialization process before execution. More specifically, "{init, rotate}" indicating that "rotate" is executed after the initialization process "init" is inserted, instead of "rotate" in the process expression O2a of executing "rotate" after execution of "set1".

The state transition model generation section 155 generates the state transition model including the states "0" to "11" specifying whether or not each event of "set1_ready", "set1", "pickup2_end", "scan_end", "rotate", "pickup2_ready" and "set2_ready" is executed in accordance with the process expression AO2, and the transition conditions for these the states. In this example, the state transition model generation section 155 reduces the number of states by replacing the AND condition of the input events "pickup2_end" and "scan_end" input in parallel with one event "rotate" with the input event "ex1".

The execution instruction row generation section 160, for the parallel execution unit 700b, receives the process expression AO2 and the state transition model from the state transition model generation section 155, and generates the execution instruction row for the parallel execution unit, based on the process expression, the state transition model and the processing content of each event stored in the processing DB 110.

Figure 10:
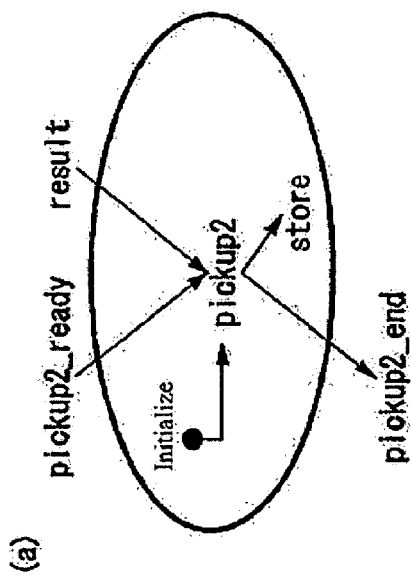
FIG. 10 shows (a) graph structure, (b) process expression and (c) state transition model for the parallel execution unit 700c according to the embodiment of the invention.
Figure 10:
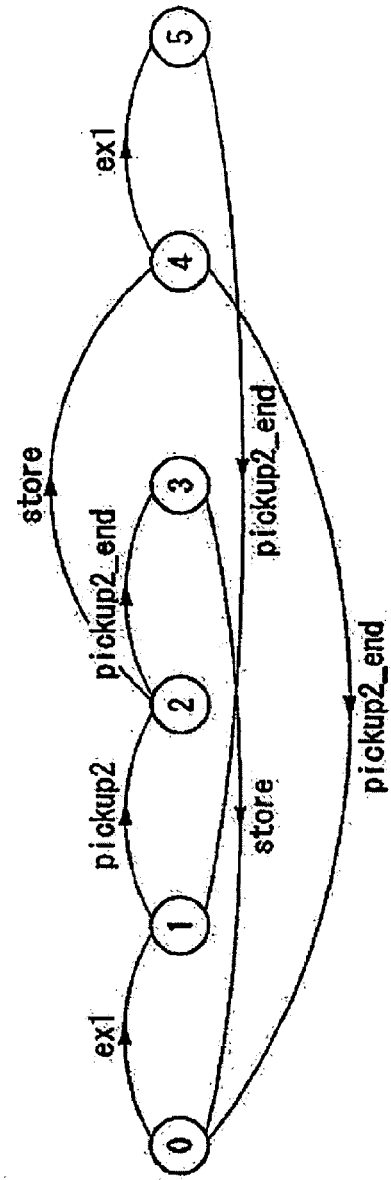

FIG. 10 shows (a) graph structure, (b) process expression and (c) state transition model for the parallel execution unit 700c according to the embodiment of the invention. The parallel execution unit 700c repeats a process of inputting "pickup2_ready" and "result", executing "pickup2", executing "store", and outputting "pickup2_end". Herein, it is required that the parallel execution unit 700c perform the initialization process prior to execution of "pickup2".

The process expression generation section 145 generates the process expression O3a of inputting "pickup2_ready", executing "pickup2", executing "store", and returning to the process of O3a for the parallel execution unit 700c. Also, it generates the process expression O3b of inputting "result", executing "pickup2", outputting "pickup2_end", and returning to the process of O3b. And the process expression generation section 145 generates the total process expression AO3 for the parallel execution unit 700c as a parallel combination of the process expressions O3a and O3b.

The initialization process insertion section 150 changes the process expression O3a to perform the initialization process of "pickup2" after input of "pickup2_ready" as in the parallel execution unit 700b. The state transition model generation section 155 generates the state transition model including the states "0" to "5" specifying whether or not each event of "pickup2_ready", "result", "pickup2", "store", and "pickup2_end" is executed in accordance with the process expression AO3, and the transition conditions for these the states. In this example, the state transition model generation section 155 reduces the number of states by replacing the AND condition of the input events "pickup2_ready" and "result" input in parallel with one event "pickup2" with the input event "ex1".

The execution instruction row generation section 160, for the parallel execution unit 700b, receives the process expression AO3 and the state transition model from the state transition model generation section 155, and generates the execution instruction row for the parallel execution unit based on the process expression, the state transition model and the processing content of each event stored in the processing DB 110. Herein, the execution instruction row generation section 160 generates, as the execution instruction row for executing "store", the execution instruction row of executing the correspondence event "pass" corresponding to "OK" when the input event "result" is the selection event "OK" before replacement, or executing the correspondence event "defect" corresponding to "NG" when the input event "result" is the selection event "NG" before replacement.

Figure 11:
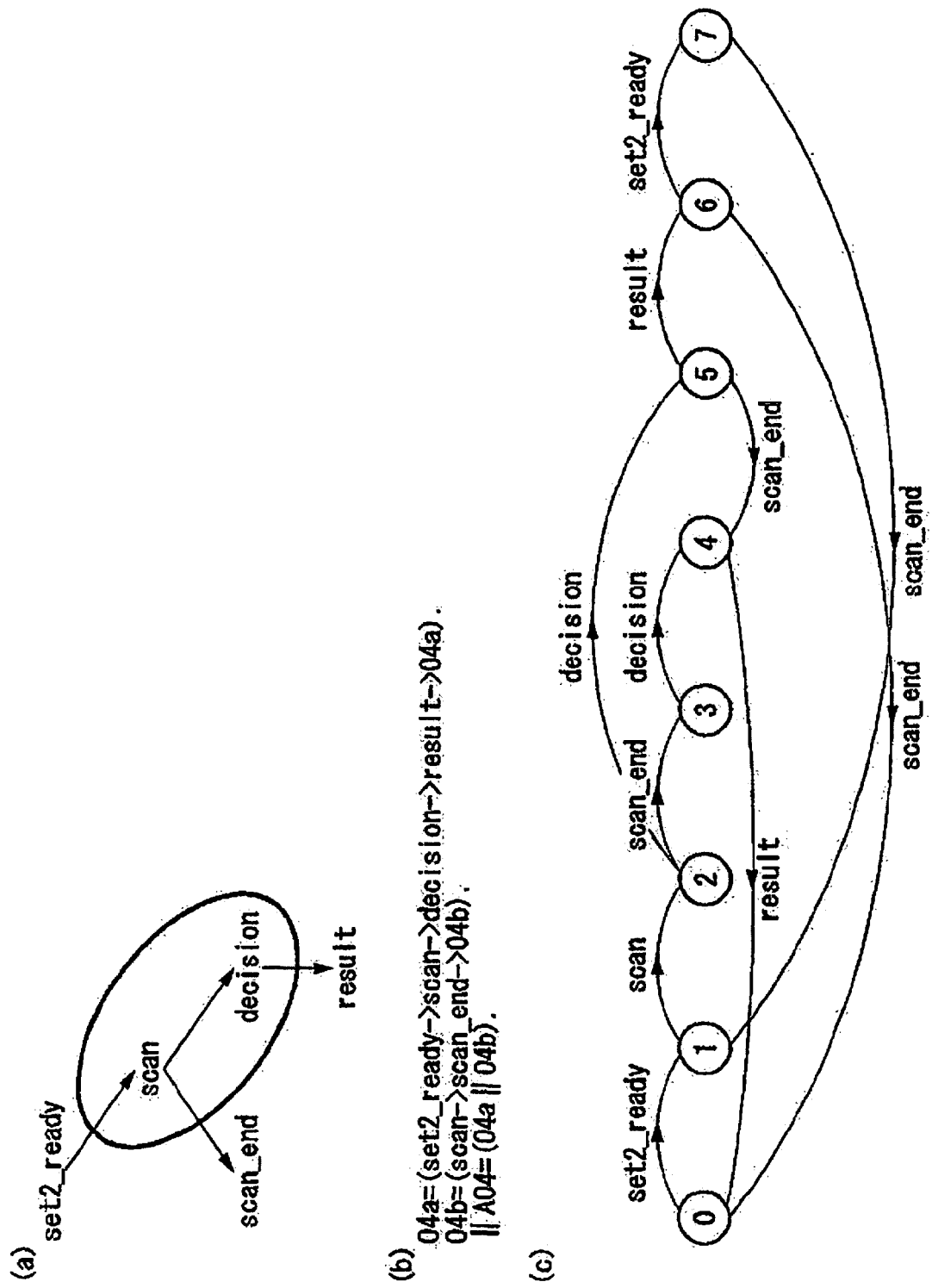
FIG. 11 shows (a) graph structure, (b) process expression and (c) state transition model for the parallel execution unit 700d according to the embodiment of the invention.

FIG. 11 shows (a) graph structure, (b) process expression and (c) state transition model for the parallel execution unit 700d according to the embodiment of the invention. The parallel execution unit 700d repeats a process of inputting "set2_ready", executing "scan", outputting "scan_end", and executing "decision". And it outputs "result" after execution of "decision".

The process expression generation section 145 generates the process expression O4*a* of inputting "set2_ready", executing "scan" and "decision" in this order, outputting "result", and returning to the process of O4*a* for the parallel execution unit 700*d*. Also, it generates the process expression O4*b* of executing "scan", outputting "scan_end", and returning to the process of O4*b*. And the process expression generation section 145 generates the total process expression AO4 for the parallel execution unit 700*d* as a parallel combination of the process expressions O4*a* and O4*b*.

The state transition model generation section 155 generates the state transition model including the states "0" to "7" specifying whether or not each event of "set2_ready", "scan", "scan_end", "decision", and "result" is executed in accordance with the process expression AO4, and the transition conditions for these the states.

The execution instruction row generation section 160, for the parallel execution unit 700*b*, receives the process expression AO4 and the state transition model from the state transition model generation section 155, and generates the execution instruction row for the parallel execution unit, based on the process expression, the state transition model and the processing content of each event stored in the processing DB 110.

Figure 12:
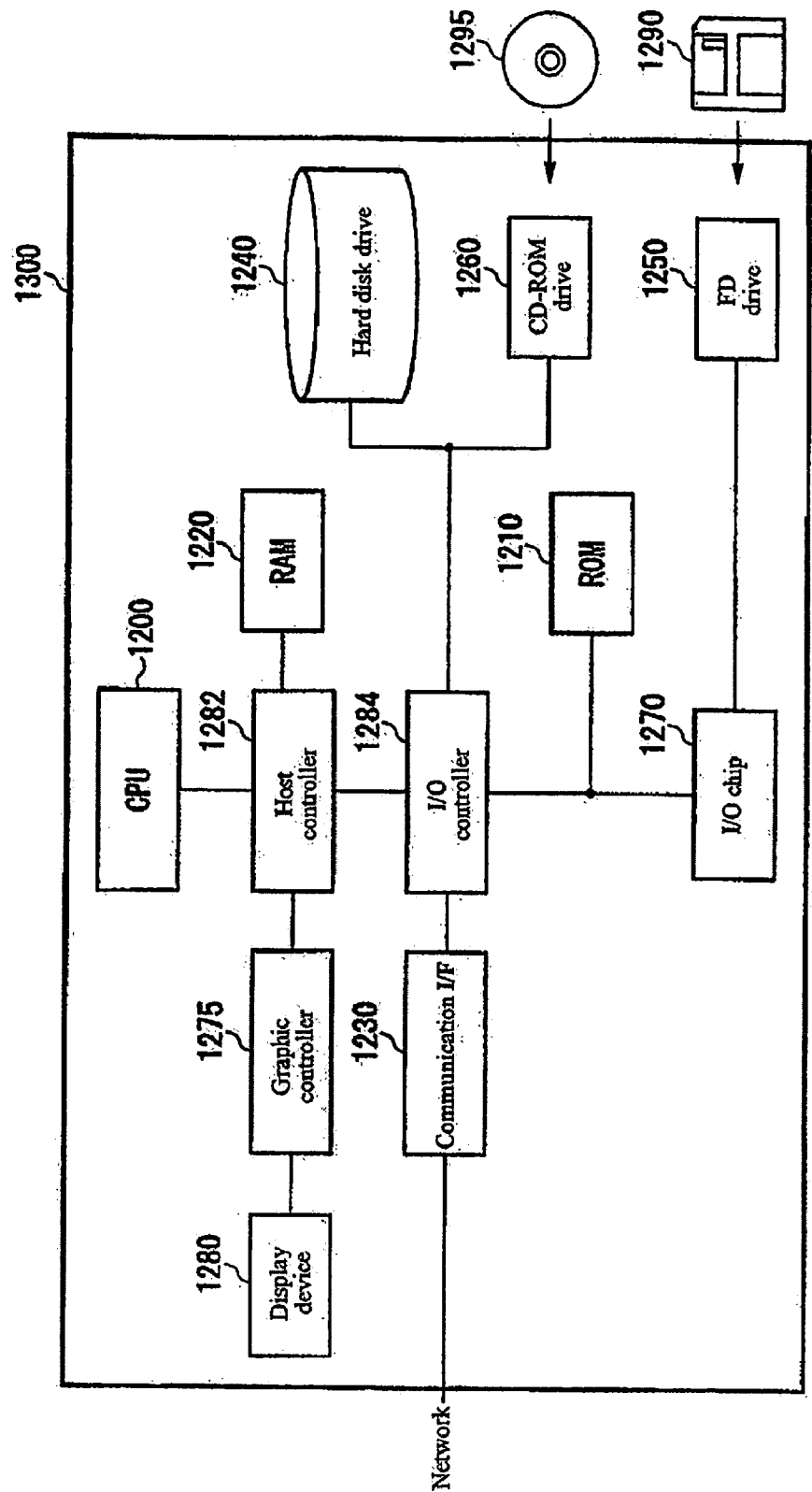
FIG. 12 is a block diagram showing one example of the hardware configuration of a computer 1300 according to the embodiment of the invention.

FIG. 12 is a block diagram showing one example of the hardware configuration of a computer 1300 according to the embodiment of the invention. The computer 1300 according to this embodiment comprises a central processing unit (CPU) peripheral portion having a CPU 1200, a random access memory (RAM) 1220, a graphic controller 1275 and a display device 1280, which are interconnected by a host controller 1282, an input/output portion having a communication interface 1230, a hard disk drive 1240, and a CD-ROM drive 1260, which are connected to the host controller 1282 by an input/output controller 1284, and a legacy input/output portion having a read only memory (ROM) 1210, a flexible disk drive 1250 and an input/output chip 1270, which are connected to the input/output controller 1284.

The host controller 1282 connects the RAM 1220 to the CPU 1200 for accessing the RAM 1220 at high transfer rate and the graphic controller 1275. The CPU 1200 operates in accordance with the program stored in the ROM 1210 and the RAM 1220 to control each unit. The graphic controller 1275 acquires the image data generated on a frame buffer provided within the RAM 1220 by the CPU 1200, and displays it on the display device 1280. Alternatively, the graphic controller 1275 may comprise the frame buffer for storing the image data generated by the CPU 1200 internally.

The input/output controller 1284 connects the host controller 1282 to the communication interface 1230 that is the input/output device having a relatively high speed, the hard disk drive 1240, and the CD-ROM drive 1260. The communication interface 1230 communicates with the other apparatuses via a network. The hard disk drive 1240 stores the program and data employed by the CPU 1200 within the computer 1300. The CD-ROM drive 1260 reads the program or data from the CD-ROM 1295, and provides it via the RAM 1220 to the hard disk drive 1240.

Also, the input/output controller 1284 is connected to the ROM 1210 and other input/output units having relatively low speed including the flexible disk drive 1250 and the input/output chip 1270. The ROM 1210 stores a boot program executed at the initiation by the computer 1300, and the program dependent on the hardware of the computer 1300. The flexible disk drive 1250 reads the program or data from the flexible disk 1290 and provides it via the RAM 1220 to the hard disk drive 1240. The input/output chip 1270 is connected to the flexible disk drive 1250 and various kinds of input/output device via a parallel port, a serial port, a keyboard port or a mouse port.

The program provided via the RAM 1220 to the hard disk drive 1240 is stored in a recording medium such as the flexible disk 1290, CD-ROM 1295 or IC card, and provided to the user. The program is read from the recording medium, installed via the RAM 1220 in the hard disk drive 1240 within the computer 1300, and executed by the CPU 1200.

The programs installed in the computer to enable the computer 1300 to operate as the program development supporting apparatus 10 consist of a directional graph acquisition module having a user interface module and a model transformation module, an event division module, a directional branch replacement module, a selection event replacement module, an inverse chain partial set extraction module, a parallel execution unit assignment module, a process expression generation module, an initialization process insertion module, a state transition model generation module and an execution instruction row generation module. These programs or modules enable the computer 1300 to operate as the directional graph acquisition section 95 having the user interface section 100 and the model transformation section 115, the event division section 122, the directional branch replacement section 125, the selection event replacement section 130, the inverse chain partial set extraction section 135, the parallel execution unit assignment section 140, the process expression generation section 145, the initialization process insertion section 150, the state transition model generation section 155, and the execution instruction row generation section 160.

Those programs or modules may be stored in an external storage medium. The storage medium may be the flexible disk 1290, the CD-ROM 1295, an optical recording medium such as digital versatile disc (DVD) or PD, an optical magnetic recording medium such as magnetic disk (MD), a tape medium, or a semiconductor memory such as an integrated circuit (IC) card. Also, the storage device such as hard disk or RAM provided in a server system connected to a private communication network or the Internet may be employed as the recording medium, and the program may be provided via the network to the computer 1300.

With the program development supporting apparatus 10 as described above, the parallelism of the program is extracted from the model of the program input by the developer, and the events of the program are appropriately assigned to a plurality of parallel execution units. And the program development supporting apparatus 10 generates the process expression and the state transition model for each parallel execution unit, and generates the execution instruction row for each parallel execution unit based on them.

Consequently, when the control program executed on the built-in computer for controlling various types of FA apparatuses disposed within the factory, various kinds of devices provided within a vehicle, or the input/output devices of the computer is executed in the multi-task environment, the parallelism for various kinds of operation that is the control object of the control program is appropriately extracted and assigned to the parallel execution unit. Thereby, the program development supporting apparatus 10 provides the control program for performing many processes efficiently employing the built-in computer of limited processing ability.

Though this invention has been described above using the embodiment, the technical scope of the invention is not limited to the scope as described in the embodiment. It will be apparent to those skilled in the art that various variations or improvements may be made to the above embodiment. Also, it will be apparent that those variations or improvements may be contained within the technical scope of the invention.

With the above embodiment, the program development supporting apparatus, the program development supporting method, the program and the recording medium as listed in the following items are realized.

What is claimed is:

1. A program development supporting apparatus that groups a plurality of events each executed in an information processor to divide the events into a plurality of parallel execution units to be executed in parallel with each other, said apparatus including at least one computer comprising:
    a directional graph acquisition section that acquires directional graph data expressing each of the plurality of events as a vertex and a restriction on the execution order between two of the plurality of events as a directional branch from a model of the program, wherein the model is separate from processing content for each of the plurality of events for the program;
    an inverse chain partial set extraction section that traces the directional branch from each event in the forward direction to extract from the directional graph data an inverse partial set that is a combination of the events having such a relationship that any one of the events cannot be reached from the other events; and
    a parallel execution unit assignment section that assigns the plurality of events belonging to the inverse partial set to units different from each other in the parallel execution units.

2. The program development supporting apparatus according to claim 1, wherein said inverse chain partial set extraction section extracts from said directional graph data said inverse chain partial set in which the number of events belonging to said inverse chain partial set is maximum among the plurality of inverse chain partial sets, and said parallel execution unit assignment section assigns the plurality of events belonging to said inverse chain partial set to the same number of parallel execution units as the number of events belonging to said inverse chain partial set.

3. The program development supporting apparatus according to claim 1, wherein said parallel execution unit assignment section assigns, for each of the events belonging to said inverse chain partial set, the event and the events that can be sequentially reached by tracing said directional branch from said event in at least one of the forward direction and the reverse direction to the same parallel execution unit.

4. The program development supporting apparatus according to claim 3, wherein said parallel execution unit assignment section assigns, for each of the events belonging to said inverse chain partial set, the event and the events that can be sequentially reached by tracing said directional branch from said event in at least one of the forward direction and the reverse direction to the same parallel execution unit, under the condition that the events that can be reached from said event are not assigned to the other parallel execution units.

5. The program development supporting apparatus according to claim 1, the at least one computer further comprising a process expression generation section for generating, for each of the plurality of parallel execution units, a process expression representing the relationship of execution order of the events assigned to the parallel execution unit based on each directional branch with the event assigned to said parallel execution unit at an end point, and a state transition model generation section for generating a state transition model for the parallel execution unit including a plurality of states specifying whether or not the event belonging to said parallel execution unit, or each of the events not belonging to said parallel execution unit connected to said event belonging to said parallel execution unit through said directional branch is executed, and a transition condition between said plurality of states based on said process expression.

6. The program development supporting apparatus according to claim 5, the at least one computer further comprising an execution instruction row generation section for generating, for each of the plurality of parallel execution units, an execution instruction row for said parallel execution unit for enabling said information processor to perform a process corresponding to said events belonging to said parallel execution unit, and perform a state transition based on said state transition model with an input of the execution result of said event not belonging to said parallel execution unit connected to said event belonging to said parallel execution unit through said directional branch based on at least one of said process expression and said state transition model for said parallel execution unit.

7. The program development supporting apparatus according to claim 6, wherein said execution instruction row generation section generates, for one event to be initialized before execution, said execution instruction row for initializing said one event under the condition that said event connected to a start point of any directional branch with said one event at an end point is executed.

8. The program development supporting apparatus according to claim 1, the at least one computer further comprising an event division section for dividing an event executed repeatedly in said information processor among said plurality of events into a first division event and a second division event, and a directional branch replacement section for replacing said directional branch with the event at the start point with the directional branch with said first division event at the start point, and replaces said directional branch with the event at the end point with said directional branch with the second division event at the end point on the circulation path leading to the event by tracing said directional branch from the event in said directional graph data in the forward direction, wherein said parallel execution unit assignment section assigns said first division event and said second division event to the same parallel execution unit.

9. The program development supporting apparatus according to claim 1, the at least one computer further comprising said plurality of events containing two or more selection events executed selectively and two or more correspondence events each corresponding to each of said two or more selection events and executed when said corresponding selection event is executed, and a selection event replacement section for replacing said two or more selection events in said directional graph data with one event, and replacing said two or more correspondence events with one event, wherein said inverse chain partial set extraction section extracts said inverse chain partial set from said directional graph data in which said two or more selection events and said two or more correspondence events are replaced with one event by said selection event replacement section.

10. A program development supporting method in which a computer groups a plurality of events each executed in an information processor to divide the events into a plurality of parallel execution units to be executed in parallel with each other, said method comprising:
    a directional graph acquisition step of acquiring from the computer directional graph data expressing each of the plurality of events as a vertex and a restriction on the execution order between two of the plurality of events as a directional branch from a model of the program, wherein the model is separate from processing content for each of the plurality of events for the program;

an inverse chain partial set extraction step of tracing the directional branch from each event in the forward direction to extract from the directional graph data, by the computer, an inverse partial set which is a combination of the events having such a relationship that any one of the events cannot be reached from the other events; and a parallel execution unit assignment step of assigning, by the computer, the plurality of events belonging to the inverse partial set to units different from each other in the parallel execution units.

11. A program for making a computer function as a program development supporting apparatus that groups a plurality of events each executed in an information processor to divide the events into a plurality of parallel execution units to be executed in parallel with each other, said program recorded on a tangible recording medium and making the computer function as:

a directional graph acquiring section that acquires directional graph data expressing each of the plurality of events as a vertex and a restriction on the execution order between two of the plurality of events as a directional branch from a model of the program, wherein the model is separate from processing content for each of the plurality of events for the program;

an inverse chain partial set extraction section that traces the directional branch from each event in the forward direction to extract from the directional graph data an inverse partial set that is a combination of the events having such a relationship that any one of the events cannot be reached from the other events; and a parallel execution unit assignment section that assigns the plurality of events belonging to the inverse partial set to units different from each other in the parallel execution units.

12. The program development supporting apparatus according to claim 1, wherein the model is described using the Unified Modeling Language (UML).

* * * * *